Dec. 4, 1928.

O. J. GROEHN 1,693,750

PANEL JOINT FOR AUTOMOBILE BODIES AND METHOD OF MAKING THE SAME

Filed Aug. 15, 1925   2 Sheets-Sheet 1

INVENTOR=
Otto J. Groehn.
By Macleod, Calver, Copeland + Dike.
ATTORNEYS

Dec. 4, 1928.
O. J. GROEHN
1,693,750
PANEL JOINT FOR AUTOMOBILE BODIES AND METHOD OF MAKING THE SAME
Filed Aug. 15, 1925
2 Sheets-Sheet 2
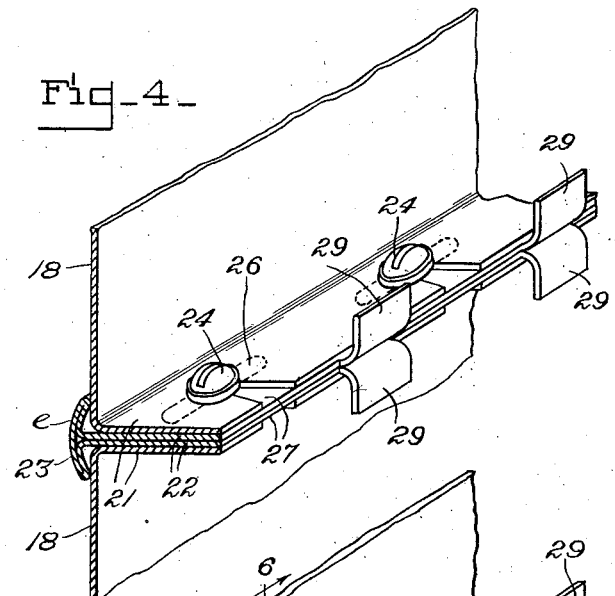
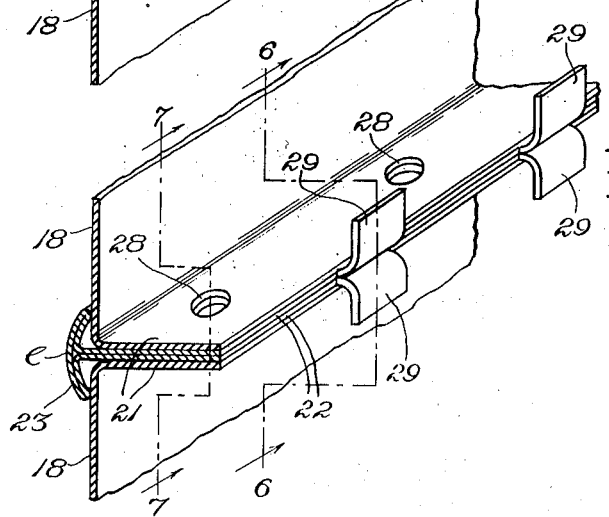
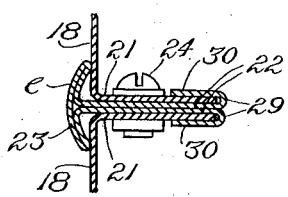
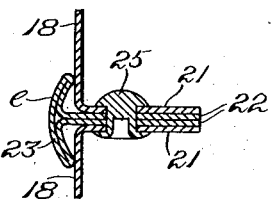
INVENTOR:
Otto J. Groehn,
By Macleod, Calvert, Copeland + Dike.
ATTORNEYS Patented Dec. 4, 1928.

1,693,750

UNITED STATES PATENT OFFICE.

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN.

PANEL JOINT FOR AUTOMOBILE BODIES AND METHOD OF MAKING THE SAME.

Application filed August 15, 1925. Serial No. 50,406.

This invention relates especially, although not exclusively, to panel joints for automobile bodies and has for its principal object to provide a panel joint comprising a molding which serves to cover and finish the joint as well as to stiffen and reinforce the same.

The foregoing and other objects of the invention will best be understood from the following description of certain forms thereof and modes of producing the latter, as illustrated in the accompanying drawings. It will be understood, however, that the particular constructions and operations described and shown have been chosen for illustrative purposes merely, and that the invention, as defined by the claims hereunto appended, may be otherwise embodied and practised without departure from the spirit and scope thereof.

In said drawings:

Figs. 4 and 5 are views similar to Fig. 2 showing other forms of the invention.

Figs. 6 and 7 are sections, taken substantially on the lines 6—6 and 7—7, Fig. 5, showing further modifications.

Figure 1:
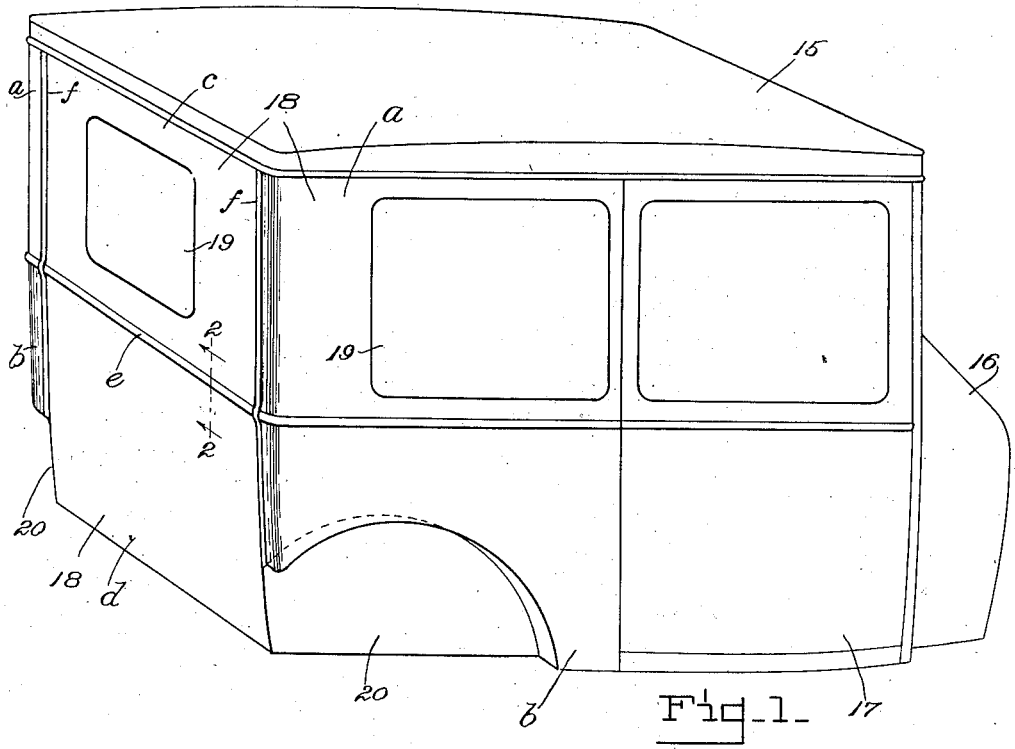
Fig. 1 is a perspective view of an automobile body constructed in accordance with the invention.

In Fig. 1 is shown a closed automobile body of the coach type having a top 15, a cowl 16, doors 17, and an enclosed rear portion composed of sheet metal panels 18. In the construction shown, the panels 18 include upper and lower quarter panels $a$ and $b$, and upper and lower back panels $c$ and $d$ respectively, the upper panels $a$ and $c$ being formed with suitable window openings 19, and the lower quarter panels $b$ being formed with suitably shaped wheel houses 20. The joints between the several panels include and are finished and reinforced by moldings which, in the construction shown, include a belt line molding $e$ for the horizontal joint between the upper and lower panels and vertical joint moldings $f$ which cross and overlap the belt line molding $e$.

Figure 2:
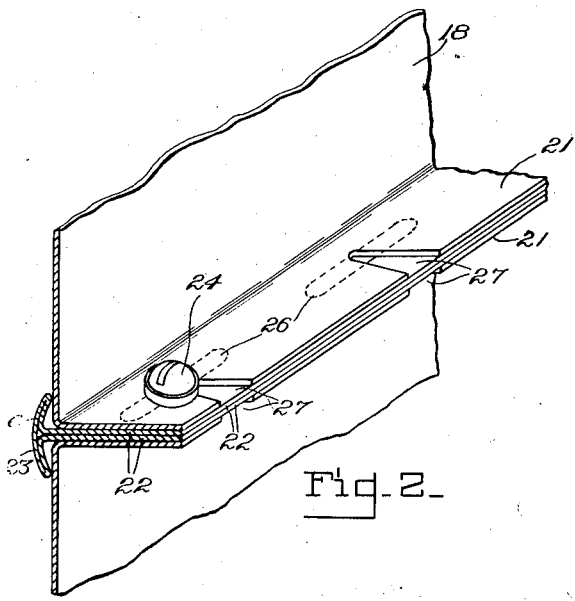
Fig. 2 is an enlarged detail perspective view, partly in section on the line 2—2, Fig. 1, of one form of panel joint.
Figure 3:
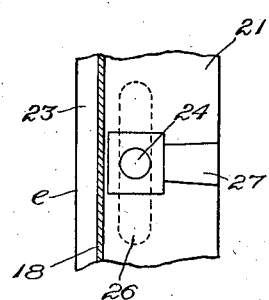
Fig. 3 is an enlarged fragmentary detail plan view of said joint.

The proximity edges of contiguous panels 18 are formed with inturned flanges 21 (Figs. 2 to 7) which are secured together as hereinafter described with an interposed flange or flanges of the corresponding molding $e$ or $f$. Each of said moldings is preferably T-shaped in cross section and is preferably formed by folding a strip of sheet metal upon itself to form superimposed flanges or a two-ply flange 22 received between the panel flanges 21, and a preferably curved bead or head 23 providing arms which overlap the adjacent marginal portions of the panels, engage the outer surfaces thereof, and conceal and finish the joint therebetween. The panel and molding flanges are all secured together by suitable fasteners passing therethrough, which fasteners may, as shown in Figs. 2, 3, 4 and 6, comprise bolts 24, or may, as shown in Fig. 7, comprise tubular or other rivets 25. The bolts 24 or rivets 25 may, as shown in Figs. 2, 3, and 4, pass through longitudinal closed slots 26 in the molding flanges and transverse open slots 27 in the panel flanges. This construction permits relative adjustment of the parts to compensate for and take up any errors in manufacture and thereby facilitate the assembly of the parts. If preferred, however, and as shown in Fig. 5, the several flanges may, at the time they are formed and before assembly, be provided with die-located, punched holes 28 adapted to register accurately when the parts are assembled in their predetermined relative positions and to receive the bolts or rivets, as more fully explained in an application filed July 1, 1925, by Stephen I. Fekete and Stuart G. Baits, Serial No. 40,737.

The molding flanges 22 are preferably, and as shown in Figs. 4 and 5, formed with portions of sufficient length to extend inwardly beyond the edges of the panel flanges 21, which portions, after assembly, are bent laterally across the inner edges of said panel flanges, thereby further securing the molding in position. Where, as above described, the molding is formed with two superposed flanges 22, the extended portions 29 thereof are preferably bent in opposite directions respectively across the edges of the respective panel flanges 21. The portions 29 may, as shown in Figs. 4 and 5, be turned into positions substantially parallel to the panels 18, in which case they may serve as supports or abutments for the interior panels or trim, or, as shown at 30 in Fig. 6, said portions may be bent or crimped entirely over upon the faces of the panel flanges 21 to further strengthen the joint. In the latter event the fasteners 24 or 25 may in some instances be omitted.

In forming the joint above described, the panels 18 are first pre-formed to the desired shape and provided with the flanges 21, the moldings formed with the flanges 22, and the panels and moldings assembled with the mold flanges between the panel flanges and with the heads 23 covering the joints. The fasteners 24 or 25, if employed, are then inserted, and the extensions 29, if provided, finally bent across the edges of the panel flanges into either the position shown in Figs. 4 and 5 or that shown in Fig. 6 to complete the joint.

Having thus described my invention, I claim:

1. In a panel joint for automobile bodies, in combination, panels having inturned edge flanges, a T-shaped molding having a flange inserted between the flanges of proximate panels and arms overlapping the marginal portions of the outer surfaces of the panels, said panel flanges and molding flange being formed respectively with slots disposed transverse to one another, and fastening means passing through said slots at their points of intersection and securing all of said flanges together.

2. In a joint for the panels of an automobile body, the combination with panels having flanged edges, of a T-shaped molding having a flange interposed between the flanged edges of proximate panels, one of said flanges being provided with a longitudinal slot and another of said flanges being provided with an open slot transverse to the edge of the flange, and fastening means passing through the several slots.

3. A panel joint for automobile bodies which comprises, in combination, panels the proximate edges of which are provided with inturned flanges, a molding having arms overlapping the proximate portions of the exterior surfaces of the panels and superposed flanges interposed between the flanges of the proximate panels, said molding flanges having portions extending inwardly beyond the panel flanges and bent in opposite directions respectively across the edges of the latter, and a fastener extending through the flanges of the molding and panels.

In testimony whereof I affix my signature.

OTTO J. GROEHN.